US008165068B2

(12) United States Patent
Zhao et al.

(10) Patent No.: US 8,165,068 B2
(45) Date of Patent: Apr. 24, 2012

(54) USER EQUIPMENT DETACH WITH MULTIPLE PACKET DATA NETWORK CONNECTIVITY

(75) Inventors: Xiaoming Zhao, Plano, TX (US); Wei Wu, Coppell, TX (US)

(73) Assignee: Research In Motion Limited, Waterloo, Ontario (CA)

( * ) Notice: Subject to any disclaimer, the term of this patent is extended or adjusted under 35 U.S.C. 154(b) by 157 days.

(21) Appl. No.: 12/395,374

(22) Filed: Feb. 27, 2009

(65) Prior Publication Data

US 2009/0262736 A1 Oct. 22, 2009

Related U.S. Application Data

(60) Provisional application No. 61/046,049, filed on Apr. 18, 2008.

(51) Int. Cl.
*H04W 76/06* (2009.01)
(52) U.S. Cl. ............... 370/328; 370/338; 709/228
(58) Field of Classification Search ............ 370/328, 370/329, 338–341, 400, 401; 709/227, 228
See application file for complete search history.

(56) References Cited

U.S. PATENT DOCUMENTS

| 2008/0320149 A1* | 12/2008 | Faccin | 709/228 |
| 2009/0176496 A1* | 7/2009 | Li et al. | 455/437 |
| 2009/0213762 A1* | 8/2009 | Guo et al. | 370/254 |
| 2009/0245177 A1* | 10/2009 | Zhao et al. | 370/328 |
| 2009/0318147 A1* | 12/2009 | Zhang et al. | 455/435.1 |

FOREIGN PATENT DOCUMENTS

| EP | 2046085 A1 | 4/2009 |
| WO | 2009120609 A1 | 10/2009 |

OTHER PUBLICATIONS

PCT International Preliminary Report on Patentability; PCT Application No. PCT/US2009/040541; Jul. 21, 2010; 11 pgs.
Zhao, Xiaoming, et al.; U.S. Appl. No. 12/408,597, filed Mar. 20, 2009; Title: System and Method for Multiple Packet Data Network Connectivity Detachment.
3GPP TS 23.401v8.1.0; 3rd Generation Partnership Project; Technical Specification Group Services and System Aspects; General Packet Radio Service (GPRS) Enhancements for Evolved Universal Terrestrial Radio Access Network (E-UTRAN) Access; Release 8; Mar. 2008; 99 pgs. Part 1.
3GPP TS 23.401v8.1.0; 3rd Generation Partnership Project; Technical Specification Group Services and System Aspects; General Packet Radio Service (GPRS) Enhancements for Evolved Universal Terrestrial Radio Access Network (E-UTRAN) Access; Release 8; Mar. 2008; 72 pgs. Part 2.

(Continued)

*Primary Examiner* — Hassan Phillips
*Assistant Examiner* — Duc Duong
(74) *Attorney, Agent, or Firm* — Conley Rose, P.C.; J. Robert Brown, Jr.

(57) ABSTRACT

A system is provided that includes a component configured to promote detachment of a user equipment (UE) from a plurality of packet data network (PDN) gateways by sending a message to each of the plurality of PDN gateways to which the UE has at least one active bearer. The message requests that at least one of the plurality of PDN gateways delete the at least one active bearer.

14 Claims, 8 Drawing Sheets

OTHER PUBLICATIONS

3GPP TS 23.402v8.1.1; 3rd Generation Partnership Project; Technical Specification Group Services and System Aspects; Architecture Enhancements for non-3GPP Accesses; Release 8; Mar. 2008; 99 pgs. Part 1.

3GPP TS 23.402v8.1.1; 3rd Generation Partnership Project; Technical Specification Group Services and System Aspects; Architecture Enhancements for non-3GPP Accesses; Release 8; Mar. 2008; 64 pgs. Part 2.

PCT International Search Report; PCT Application No. PCT/US2009/040541; Aug. 27, 2009; 4 pgs.

PCT Written Opinion of the International Searching Authority; PCT Application No. PCT/US2009/040541; Aug. 27, 2009; 6 pgs.

* cited by examiner

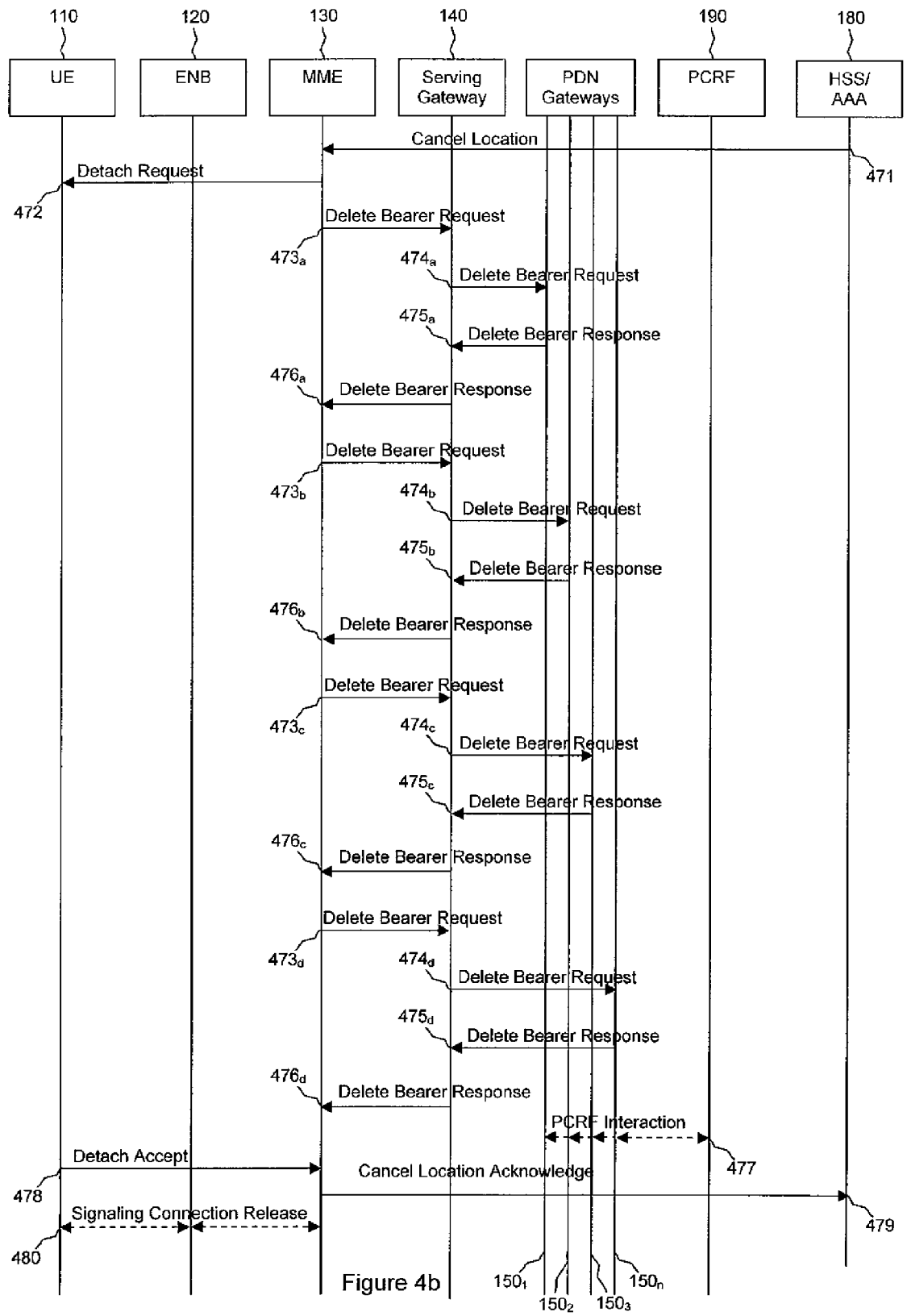

USER EQUIPMENT DETACH WITH MULTIPLE PACKET DATA NETWORK CONNECTIVITY

CROSS-REFERENCE TO RELATED APPLICATIONS

The present application claims priority to U.S. Provisional Patent Application No. 61/046,049, filed Apr. 18, 2008, by Xiaoming Zhao, et al, entitled "User Equipment Detach with Multiple Packet Data Network Connectivity", which is incorporated by reference herein as if reproduced in its entirety.

BACKGROUND

Easily transportable devices with wireless telecommunications capabilities, such as mobile telephones, personal digital assistants, handheld computers, and similar devices, will be referred to herein as user equipment (UE). The term "UE" may refer to a device and its associated Universal Integrated Circuit Card (UICC) that includes a Subscriber Identity Module (SIM) application, a Universal Subscriber Identity Module (USIM) application, or a Removable User Identity Module (R-UIM) application or may refer to the device itself without such a card. The term "UE" may also refer to devices that have similar capabilities but that are not transportable, such as a desktop computer or a set-top box. A connection between a UE and some other element in a telecommunications network might promote a voice call, a file transfer, or some other type of data exchange, any of which can be referred to as a call or a session.

Some UEs communicate in a circuit switched mode, wherein a dedicated communication path exists between two devices. For the duration of a call or session, all data exchanged between the two devices travels along the single path. Some UEs have the capability to communicate in a packet switched mode, wherein a data stream representing a portion of a call or session is divided into packets that are given unique identifiers. The packets might then be transmitted from a source to a destination along different paths and might arrive at the destination at different times. Upon reaching the destination, the packets are reassembled into their original sequence based on the identifiers.

Communications that take place via circuit switching can be said to occur in the circuit switched domain and communications that take place via packet switching can be said to occur in the packet switched domain. Within each domain, several different types of networks, protocols, or technologies can be used. In some cases, the same network, protocol, or technology can be used in both domains. The wireless communication networks may be based on Code Division Multiple Access (CDMA), Time Division Multiple Access (TDMA), Frequency Division Multiple Access (FDMA), Orthogonal Frequency Division Multiplexing (OFDM), or some other multiple access scheme. A CDMA-based network may implement one or more standards such as 3GPP2 IS-2000 (commonly referred to as CDMA 1x), 3GPP2 IS-856 (commonly referred to as CDMA 1xEV-DO), or 3GPP UMTS (Universal Mobile Telecommunications System). The modes of access for UMTS are referred to as Universal Terrestrial Radio Access (UTRA). A TDMA-based network may implement one or more standards such as 3GPP Global System for Mobile Communications (GSM) or 3GPP General Packet Radio Service (GPRS).

GSM is an example of a wireless network standard that uses only the circuit switching mode. Examples of wireless network standards that use only packet switching include GPRS, CDMA 1x EV-DO, Worldwide Interoperability for Microwave Access (WiMax), and Wireless Local Area Network (WLAN), which might comply with Institute of Electrical and Electronics Engineers (IEEE) standards such as 802.16, 802.16e, 802.11a, 802.11b, 802.11g, 802.11n, and similar standards. Examples of wireless network standards that may use both circuit switching and packet switching modes include CDMA 1x and UMTS. The IP (Internet Protocol) Multimedia Subsystem (IMS) is a packet switched technology that allows multimedia content to be transmitted between UEs.

In traditional wireless telecommunications systems, transmission equipment in a base station transmits signals throughout a geographical region known as a cell. As technology has evolved, more advanced equipment has been introduced that can provide services that were not possible previously. This advanced equipment might include, for example, an enhanced node B (ENB) rather than a base station or other systems and devices that are more highly evolved than the equivalent equipment in a traditional wireless telecommunications system. As technology evolves, other access devices might be used to gain access to networks. These devices as well as conventional base stations and various types of radio access technologies may all be referred to herein as ENBs. Such advanced or next generation equipment may be referred to herein as long-term evolution (LTE) equipment, and a packet-based network that uses such equipment can be referred to as an evolved packet system (EPS). Although various examples may include or refer to LTE, the present disclosure is not so limited and may be equally applicable in other networks and systems.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4b is a call flow diagram for an HSS/AAA-initiated detachment of a UE from a plurality of PDN gateways according to an alternative embodiment of the disclosure.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
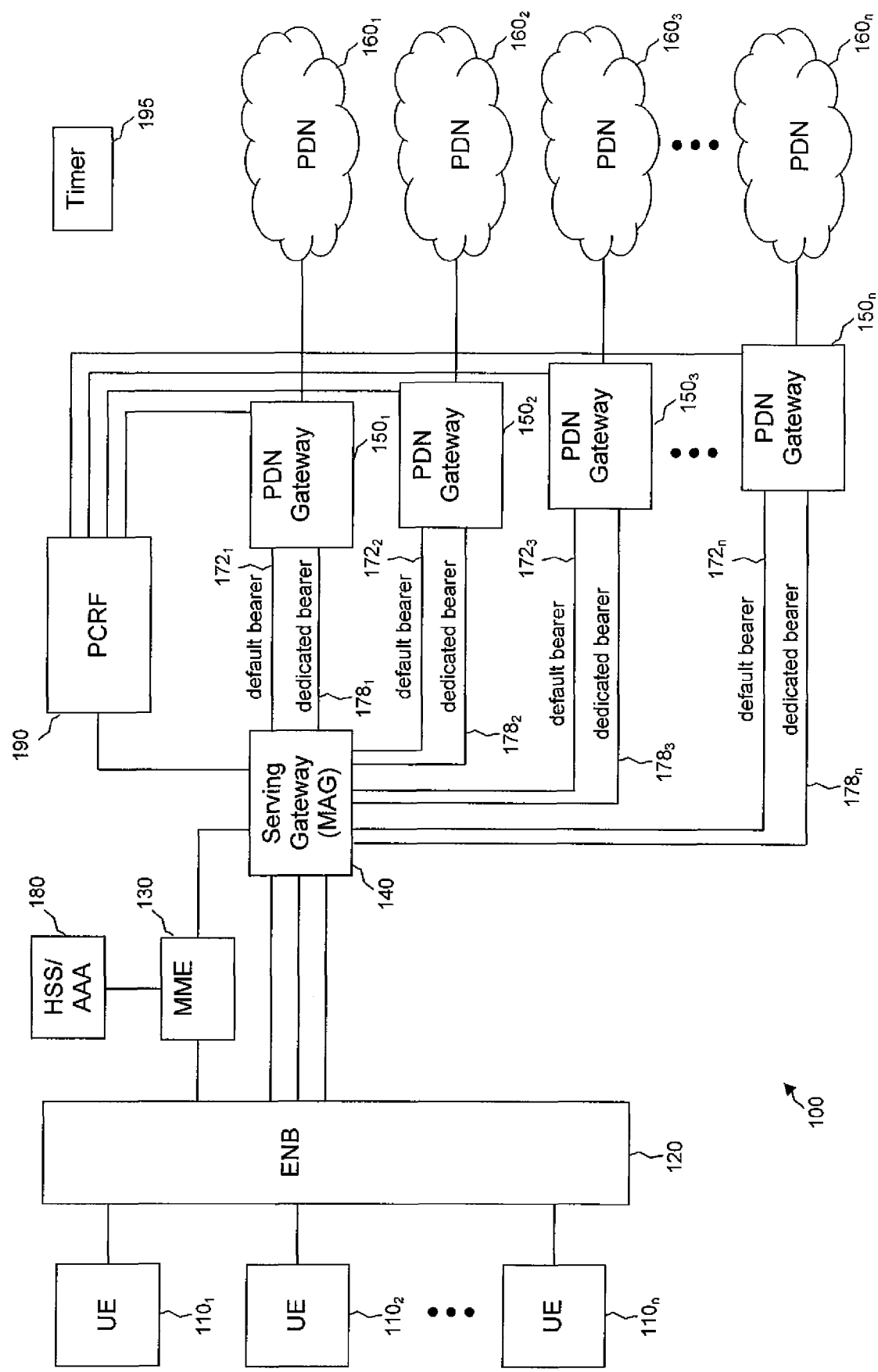
FIG. 1 is an illustration of a wireless telecommunications system according to an embodiment of the disclosure.

FIG. 1 illustrates an exemplary wireless telecommunications system 100 according to an embodiment of the disclosure. It should be noted that some of the lines connecting the components in FIG. 1 might represent bearer connections and some of the lines might represent signaling connections. Traditionally, different styles of lines are used to represent the different types of connections. However, for the sake of clarity in the drawing, the different types of connections in FIG. 1 are represented by the same style of line. Also, other connections that are not shown might exist between the components in FIG. 1.

The system 100 includes a plurality of UEs 110 each of which can connect to a plurality of packet data networks (PDNs) 160. The PDNs 160 might be Internet-based networks or might be other types of networks that can provide packet-based data. The PDNs 160 could also be considered to be access point names (APNs). Each PDN 160 can allow access to packet-based services, such as World Wide Web pages, multimedia broadcast/multicast services, and other data packet-based services. To access the PDNs 160, the UEs 110 might first establish one or more radio bearer connections with an ENB 120, a base station, a radio access technology, or a similar component. As mentioned previously, any such component will be referred to herein as the ENB 120. While only one ENB 120 is shown, multiple ENBs 120 could be present.

The UEs 110 may connect, via the ENB 120, to a serving gateway 140, which can also be referred to as a mobile access gateway (MAG). The serving gateway 140 terminates the user plane interface of the radio access portions of the system 100. The UEs 110 may also connect, via the ENB 120, to a mobility management entity (MME) 130, which then connects to the serving gateway 140. The MME 130 terminates the control plane interface of the radio access portions of the system 100. In practice, the MME 130 and the serving gateway 140 may be components in the same physical device, but they can be thought of as separate logical devices. Therefore, actions that are described herein in relation to one of these components might occur in relation to the other or to both of these components. Also, the device referred to as the MME 130 might, in a non-3GPP environment, be an access server or a similar component. Any such component will be referred to herein as the MME 130.

The serving gateway 140 forwards packets to the PDNs 160 via a plurality of PDN gateways 150. While each PDN gateway 150 is shown providing access to only one PDN 160, each PDN gateway 150 might provide access to a plurality of PDNs 160. The PDN gateways 150 might be other types of network gateways or similar components but will be referred to herein as the PDN gateways 150.

Multiple bearers may be established between the serving gateway 140 and each of the PDN gateways 150. An initial connection between one of the PDN gateways 150 and the serving gateway 140 is known as a default bearer 172 for that PDN gateway 150. The default bearer 172 is typically a non-guaranteed bit rate (non-GBR) connection so that "always on" connectivity can be supported.

After the default bearer 172 is connected to one of the PDN gateways 150, any additional connections that are made from the serving gateway 140 to that PDN gateway 150 are known as dedicated bearers 178. Based on the UEs' quality of service (QoS) profiles, the dedicated bearers 178 might conform to a set of QoS requirements, such as a guaranteed bit rate, a maximum bit rate, a packet delay budget, and other parameters of data transfer quality. In FIG. 1, only one dedicated bearer 178 connects each of the PDN gateways 150 to the serving gateway 140, but in other cases there could be no dedicated bearers 178 or multiple dedicated bearers 178 to each PDN gateway 150.

A home subscriber server (HSS), or an authentication/authorization accounting (AM) server, or a similar component 180 can connect to the MME 130 and can store data related to services available to the UEs 110, billing policies for the UEs 110, and similar UE profile data. If dynamic policy and charge control (PCC) rules are deployed in the system 100, a policy control and charging rules function (PCRF) 190, or a similar component might be present. The PCRF 190 can connect to the serving gateway 140 and the PDN gateways 150 and can store policies related to the connections between the ENB 120 and the PDN gateways 150. While only one PCRF 190 is shown, multiple PCRFs 190 could be present, and each of the PDN gateways 150 could connect to more than one PCRF 190.

Some of the UEs 110 might connect to two or more PDN gateways 150 concurrently via the serving gateway 140. This could provide the UEs 110 with fast access to multiple PDNs 160. For example, one of the UEs 110 might connect to PDN $160_1$ in order to access the World Wide Web and might connect to PDN $160_2$ in order to access a video download. If concurrent bearers exist to both PDN gateway $150_1$ and PDN gateway $150_2$, the user could quickly switch between accessing PDN $160_1$ and PDN $160_2$. If concurrent bearers were not possible and the user wished to switch from PDN $160_1$ to PDN $160_2$, an existing bearer might need to be torn down and a new bearer established at the time access to PDN $160_2$ was attempted.

One of the UEs 110 that is connected to one of the PDN gateways 150 could be detached from the PDN gateway 150 under various circumstances. In a UE-initiated detach, the UE 110 informs the PDN gateway 150 to which it is connected that it no longer wishes to maintain the connection. The UE 110 then exchanges appropriate messages with the PDN gateway 150, possibly via one or more intermediary components, to cause the UE 110 to detach from the PDN gateway 150.

In a network-initiated detach, a component in the system 100 other than the UE 110 initiates the detachment of the UE 110 from the PDN gateway 150. For example, the MME 130 might detach the UE 110 as a result of the MME 130 not receiving a keep-alive response from the UE 110. Alternatively, the HSS/AAA 180 might detach the UE 110 based on a service expiring or being disallowed.

UE-initiated detaches are explicit, in that the UE 110 explicitly requests the detach and sends and receives signals to bring the detach about. Network-initiated detaches can be either explicit or implicit. In an explicit network-initiated detach, a component such as the MME 130 or the HSS/AAA 180 informs the UE 110 that the component is initiating a detach of the UE 110 and exchanges message related to the detach with the UE 110. In an implicit detach, a component such as the MME 130 or the HSS/AAA 180 initiates the detach without notifying the UE 110. Implicit detaches typically occur when it is presumed that communication with the UE 110 is not possible, such as when radio conditions are poor.

Embodiments of the present disclosure provide for the detachment of a UE that is concurrently connected to a plurality of PDN gateways 150. Procedures are provided for UE-initiated, MME-initiated, and HSS/AAA-initiated detaches from multiple PDN gateways.

Figure 2A:
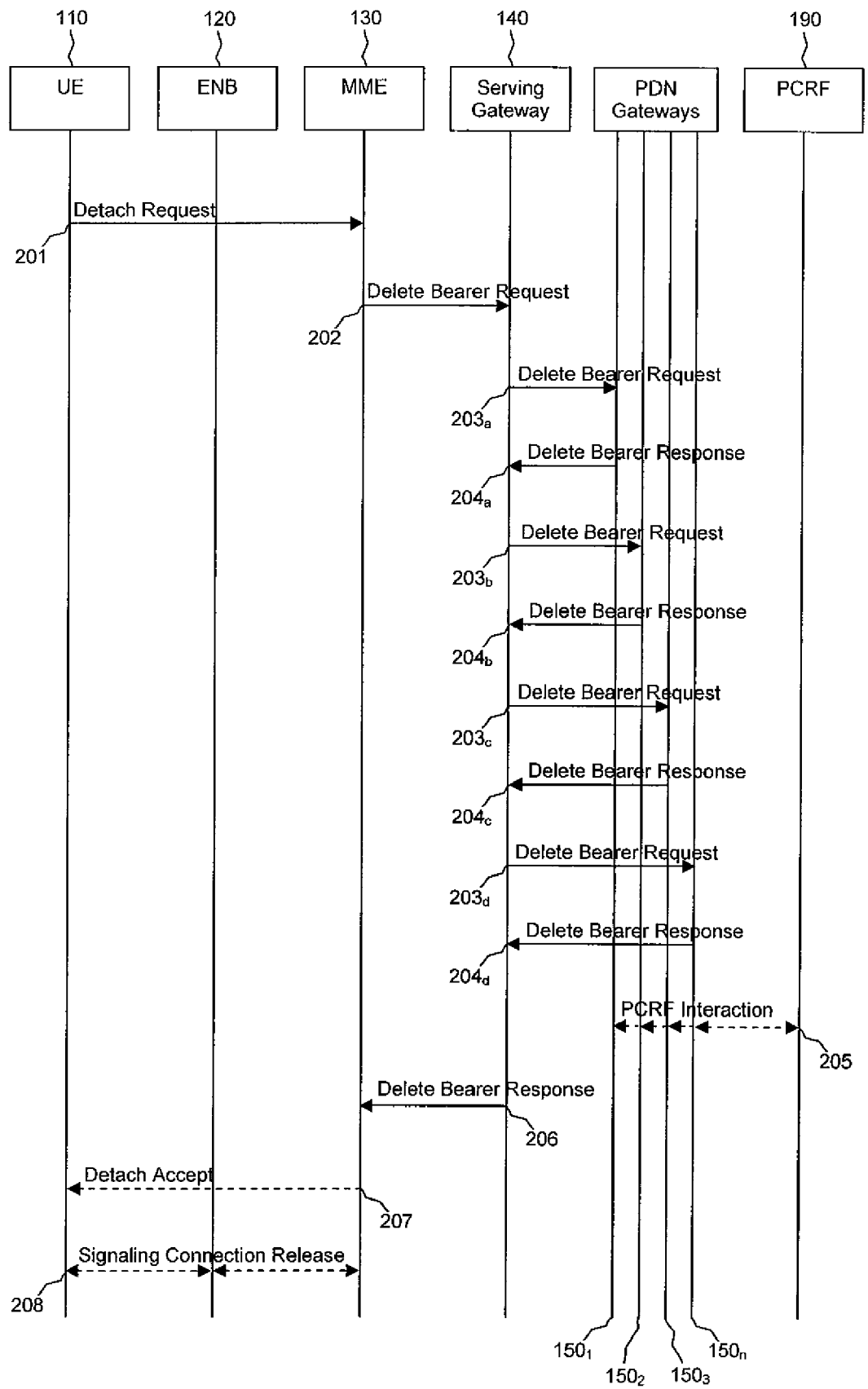
FIG. 2a is a call flow diagram for a UE-initiated detachment of a UE from a plurality of PDN gateways according to an embodiment of the disclosure.

FIG. 2a illustrates an embodiment of a call flow diagram for a UE-initiated detach of one of the UEs 110 from multiple PDN gateways 150. The PDN gateways 150 are depicted by lines labeled $150_1$, $150_2$, $150_3$, and $150_n$. At event 201, the UE 110 sends a Detach Request message to the MME 130. The message might include a "switch off" parameter that indicates whether the detach is due to a switch off situation. At event 202, the MME 130 sends a Delete Bearer Request message to the serving gateway 140, which lists the active bearers connecting the UE 110 to the serving gateway 140 that are to be deactivated.

At events $203_a$, $203_b$, $203_c$, and $203_d$, the serving gateway 140 sends Delete Bearer Request messages to each of the PDN gateways $150_1$, $150_2$, $150_3$, and $150_n$, respectively, to which the UE 110 has active bearers. At events $204_a$, $204_b$, $204_c$, and $204_d$, each of the PDN gateways $150_1$, $150_2$, $150_3$, and $150_n$, respectively, acknowledges the Delete Bearer Request messages with Delete Bearer Response messages. The Request messages and the Response messages are shown occurring in an alternating manner, with one of the PDN gateways 150 sending a Response message before the serving gateway 140 sends a Request message to another PDN gateway 150, but the messaging does not necessarily occur in this manner. The serving gateway 140 might send Request messages to some or all of the PDN gateways 150 before receiving a Response message from one of the PDN gateways 150.

Also, as mentioned previously, the MME 130 and the serving gateway 140 may be components of the same physical device, even though they are depicted in FIG. 2 as separate components. Therefore, the messages exchanged at events 203 and 204 may be exchanged between the PDN gateways 150 and the serving gateway 140, as shown, or between the PDN gateways 150 and the MME 130 or a single component that includes both the MME 130 and the serving gateway 140.

At event 205, if one or more PCRFs 190 are deployed, the PDN gateways 150 might interact with the PCRFs 190 to indicate to the PCRFs 190 that the bearers are released. At event 206, the serving gateway 140 acknowledges the MME's Delete Bearer Request message with a Delete Bearer Response message to the MME 130. The serving gateway 140 acknowledges to the MME 130 with a Delete Bearer Response message only after receiving Delete Bearer Response messages from all of the PDN gateways 150. At event 207, if the "switch off" parameter indicates that the detach is not due to a switch off situation, the MME 130 sends a Detach Accept message to the UE 110. At event 208, the MME 130 releases its signaling connection with the UE 110 by sending a Release Command to the ENB 120 indicating that the cause for the release was a detach.

In FIG. 2a, at event 202, the MME 130 sent a single message to the serving gateway 140 containing a list of all PDN gateways 150 to be detached. The serving gateway 140 then sent individual bearer deletion messages to each of the PDN gateways 150 and received individual bearer response messages from each of the PDN gateways 150. The serving gateway 140 then sent a single bearer response message to the MME 130 listing all the PDN gateways 150 from which it received bearer response messages. In an alternative embodiment, the MME 130 might send individual bearer deletion messages to the serving gateway 140 for each PDN gateway 150 to be detached, and the serving gateway 140 might then send individual bearer deletion messages to each of the PDN gateways 150 as in FIG. 2a.

Figure 2B:
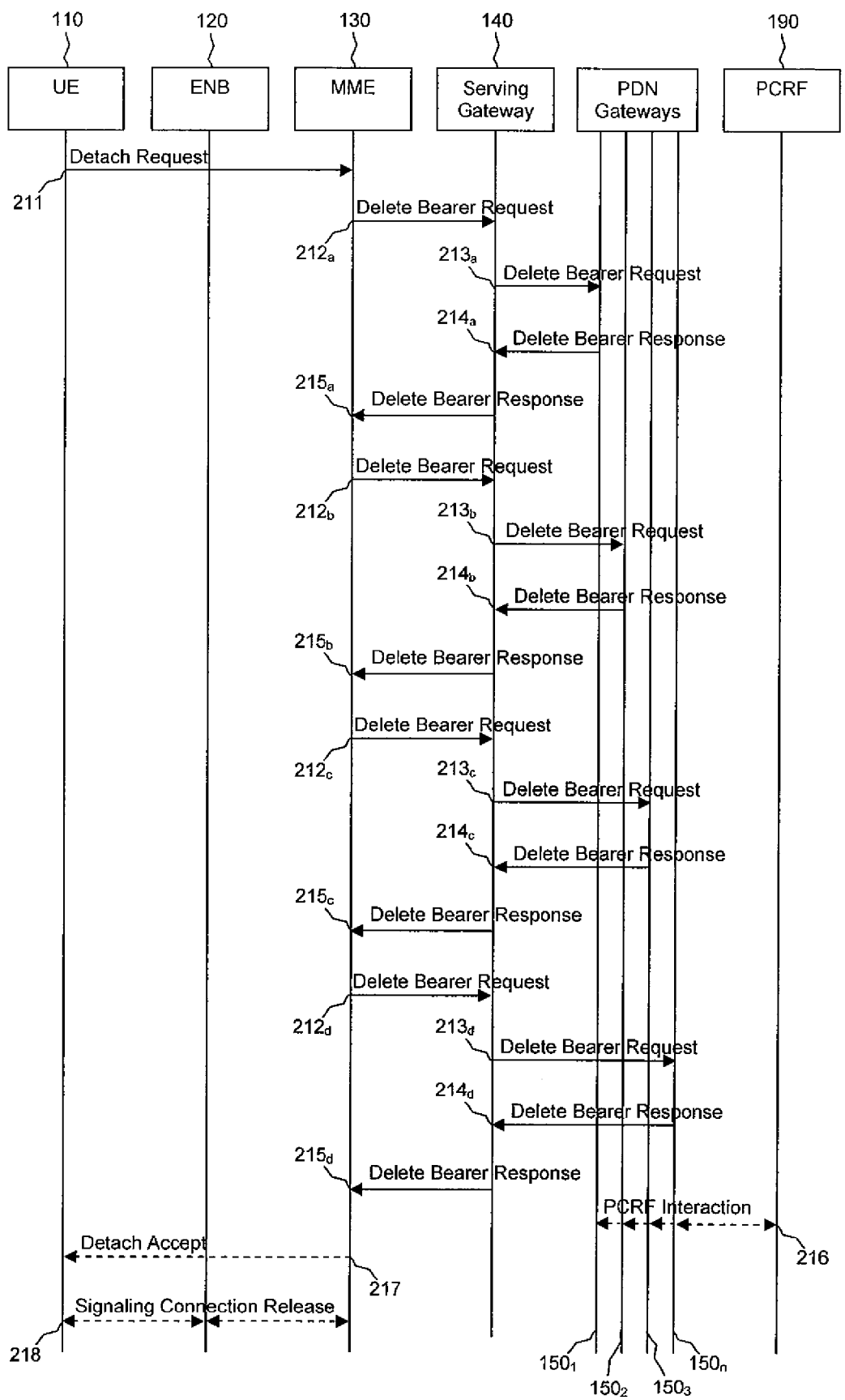
FIG. 2b is a call flow diagram for a UE-initiated detachment of a UE from a plurality of PDN gateways according to an alternative embodiment of the disclosure.

This case is illustrated in FIG. 2b, where the MME 130, upon receiving a Detach Request message from the UE 110 at event 211, sends a Delete Bearer Request message to the serving gateway 140 at event $212_a$. At event $213_a$, the serving gateway 140 then sends a Delete Bearer Request message to PDN gateway $150_1$. At event $214_a$, PDN gateway $150_1$ acknowledges the Delete Bearer Request message with a Delete Bearer Response message. At event $215_a$, the serving gateway 140 sends a Delete Bearer Response message to the MME 130. A similar set of events could occur for each of the other PDN gateways $150_2$, $150_3$, and $150_4$, but it should be noted that the events do not necessarily occur in the order illustrated. For example, the MME 130 might send the second Delete Bearer Request message, as shown at event $212_b$, before the serving gateway 140 sends PDN gateway $150_1$ the first Delete Bearer Request message, as shown at event $213_a$, or before PDN gateway $150_1$ sends the serving gateway 140 the first Delete Bearer Response message, as shown at event $214_a$. Other sequences for these events may be apparent to one of skill in the art. The complete detach sequence might be considered complete only when all of the Delete Bearer Response messages at events 215 have been received by the MME 130.

At event 216, if one or more PCRFs 190 are deployed, the PDN gateways 150 might interact with the PCRFs 190 to indicate to the PCRFs 190 that the bearers are released. These interactions might occur after all the Delete Bearer Response messages at events 215 have been sent, as shown, or might occur intermittently among the various Delete Bearer Response messages at events 215. Events 217 and 218 can then occur in a manner similar to events 207 and 208 of FIG. 2a.

Figure 3A:
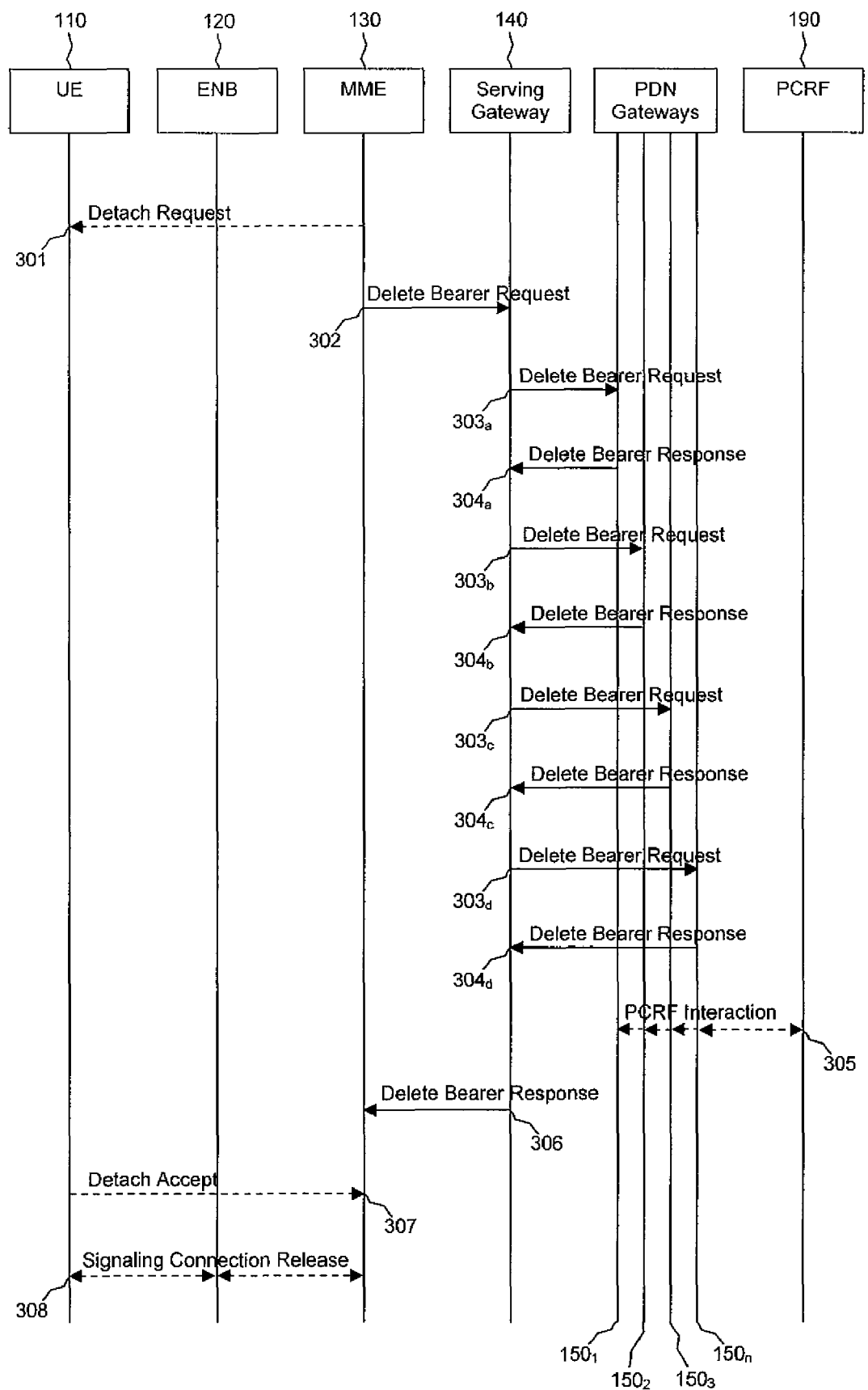
FIG. 3a is a call flow diagram for an MME-initiated detachment of a UE from a plurality of PDN gateways according to an embodiment of the disclosure.

FIG. 3a illustrates an embodiment of a call flow diagram for an MME-initiated detach of one of the UEs 110 from multiple PDN gateways 150. At event 301, depending on whether the MME-initiated detach is implicit or explicit, the MME 130 might send a Detach Request message to the UE 110. If the MME 130 has not had communication with the UE 110 for an extended period of time, the MME 130 may implicitly detach the UE 110. In this case, the MME 130 does not send a Detach Request message to the UE 110. If the MME 130 explicitly detaches the UE 110, the MME 130 does send a Detach Request message to the UE 110. The Detach Request message can contain a detach type, which might be set to "reattach", in which case the UE 110 reattaches at the end of the detach process. At event 302, the MME 130 sends a Delete Bearer Request message to the serving gateway 140, which lists the active bearers connecting the UE 110 to the serving gateway 140 that are to be deactivated.

At events $303_a$, $303_b$, $303_c$, and $303_d$, the serving gateway 140 sends Delete Bearer Request messages to each of the PDN gateways $150_1$, $150_2$, $150_3$, and $150_n$, respectively, to which the UE 110 has active bearers. At events $304_a$, $304_b$, $304_c$, and $304_d$, each of the PDN gateways $150_1$, $150_2$, $150_3$, and $150_n$, respectively, acknowledges the Delete Bearer Request messages with Delete Bearer Response messages. The Response messages may be returned in a different sequence than Request messages were sent as opposed to the alternating sequence shown. Also, the messages exchanged at events 303 and 304 may be exchanged between the PDN gateways 150 and the serving gateway 140, the MME 130, or a single component that includes both the MME 130 and the serving gateway 140.

At event 305, if one or more PCRFs 190 are deployed, the PDN gateways 150 might interact with the PCRFs 190 to indicate to the PCRFs 190 that the bearers are released. At event 306, the serving gateway 140 acknowledges the MME's Delete Bearer Request message with a Delete Bearer Response message to the MME 130. The serving gateway 140 acknowledges to the MME 130 with a Delete Bearer Response message only after receiving Delete Bearer Response messages from all of the PDN gateways 150. At event 307, if the UE 110 received a Detach Request message from the MME 130 at event 301, the UE 110 sends a Detach Accept message to the MME 130. This event can occur any time after event 301. At event 308, after the MME 130 receives the Detach Accept message, if the detach type did not request the UE 110 to reattach, the MME 130 releases its signaling connection with the UE 110 by sending a Release Command to the ENB 120 indicating that the cause for the release was a detach.

In FIG. 3a, as in FIG. 2a, the MME 130 sent a single message to the serving gateway 140 containing a list of all PDN gateways 150 to be detached. The serving gateway 140 then sent individual bearer deletion messages to each of the PDN gateways 150 and received individual bearer response messages from each of the PDN gateways 150. The serving gateway 140 then sent a single bearer response message to the MME 130 listing all the PDN gateways 150 from which it received bearer response messages. In an alternative embodiment, the MME 130 might send individual bearer deletion messages to the serving gateway 140 for each PDN gateway 150 to be detached, and the serving gateway 140 might then send individual bearer deletion messages to each of the PDN gateways 150 as in FIG. 3a.

Figure 3B:
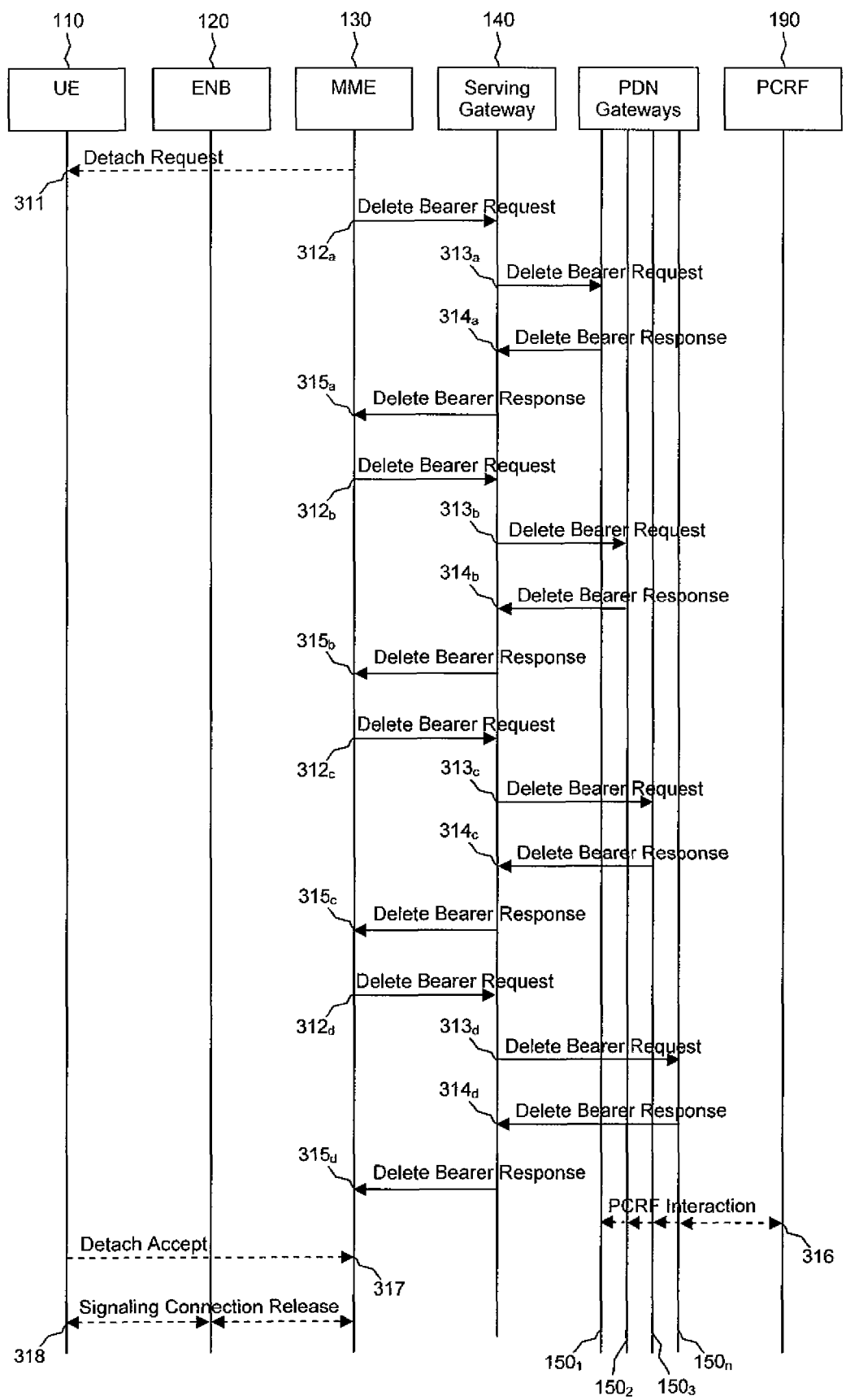
FIG. 3b is a call flow diagram for an MME-initiated detachment of a UE from a plurality of PDN gateways according to an alternative embodiment of the disclosure.

This case is illustrated in FIG. 3b, where the MME 130, after sending a Detach Request message to the UE 110 at event 311, sends a Delete Bearer Request message to the serving gateway 140 at event $312_a$. At event $313_a$, the serving gateway 140 then sends a Delete Bearer Request message to PDN gateway $150_1$. At event $314_a$, PDN gateway $150_1$ acknowledges the Delete Bearer Request message with a Delete Bearer Response message. At event $315_a$, the serving gateway 140 sends a Delete Bearer Response message to the MME 130. A similar set of events could occur for each of the other PDN gateways $150_2$, $150_3$, and $150_4$, but it should be noted that the events do not necessarily occur in the order illustrated. For example, the MME 130 might send the second Delete Bearer Request message, as shown at event $312_b$, before the serving gateway 140 sends PDN gateway $150_1$ the first Delete Bearer Request message, as shown at event $313_a$, or before PDN gateway $150_1$ sends the serving gateway 140 the first Delete Bearer Response message, as shown at event $314_a$. Other sequences for these events may be apparent to one of skill in the art The complete detach sequence might be considered complete only when all of the Delete Bearer Response messages at events 315 have been received by the MME 130.

At event 316, if one or more PCRFs 190 are deployed, the PDN gateways 150 might interact with the PCRFs 190 to indicate to the PCRFs 190 that the bearers are released. These interactions might occur after all the Delete Bearer Response messages at events 315 have been sent, as shown, or might occur intermittently among the various Delete Bearer Response messages at events 315. Events 317 and 318 can then occur in a manner similar to events 307 and 308 of FIG. 3a.

Figure 4A:
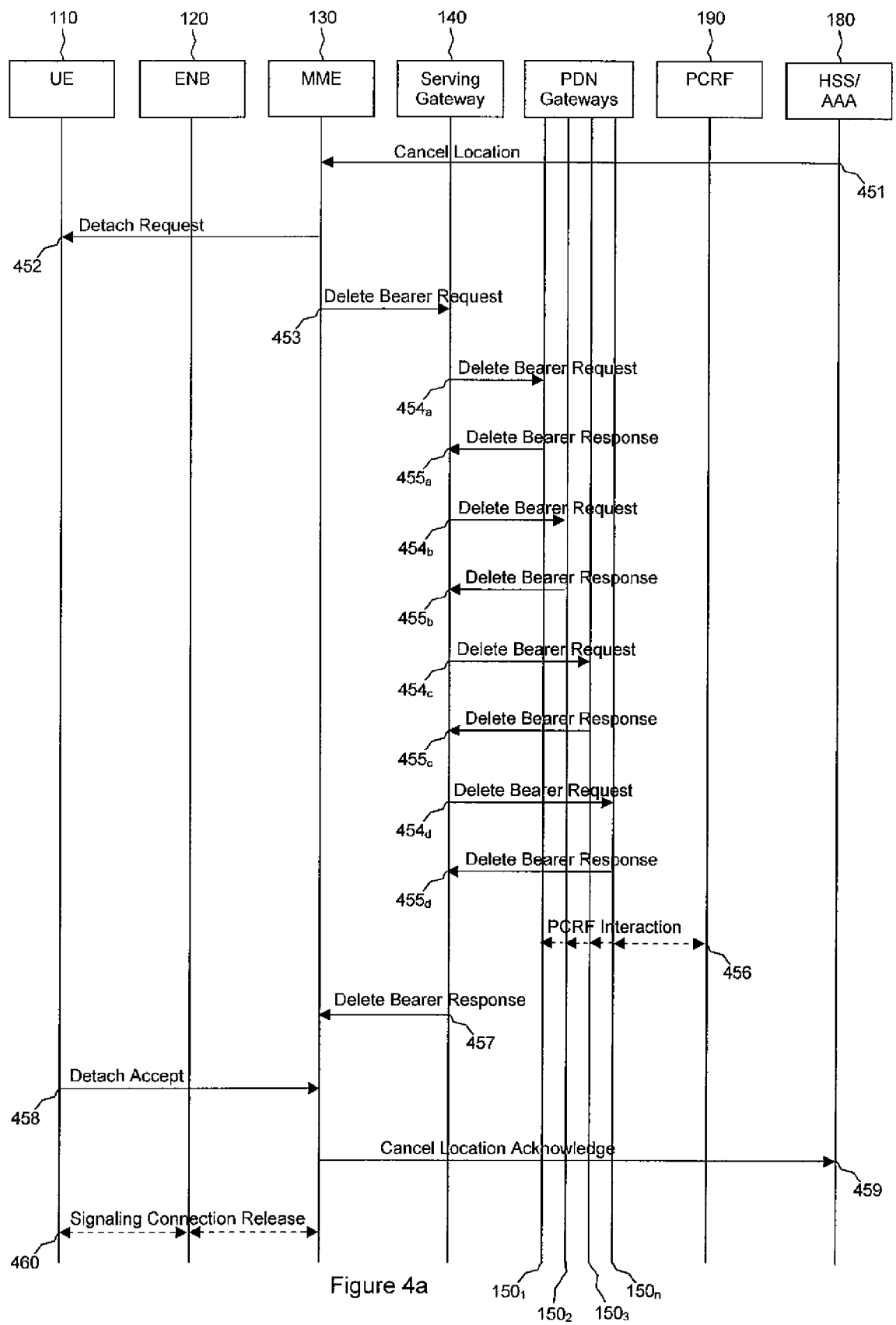
FIG. 4a is a call flow diagram for an HSS/AAA-initiated detachment of a UE from a plurality of PDN gateways according to an embodiment of the disclosure.

FIG. 4a illustrates an embodiment of a call flow diagram for an HSS/AAA-initiated detach of one of the UEs 110 from multiple PDN gateways 150. At event 451, if the HSS/AAA 180 wants to request the immediate deletion of a subscriber's bearers and mobility management contexts, the HSS/AAA 180 sends a Cancel Location message to the MME 130 with the cancellation type parameter set to "subscription withdrawn". At event 452, if the cancellation type is "subscription withdrawn", the MME 130 informs the UE 110 that the UE 110 has been detached by sending a Detach Request message to the UE 110. At event 453, the MME 130 sends a Delete Bearer Request message to the serving gateway 140, which lists the active bearers connecting the UE 110 to the serving gateway 140 that are to be deactivated.

At events $454_a$, $454_b$, $454_c$, and $454_d$, the serving gateway 140 sends Delete Bearer Request messages to each of the PDN gateways $150_1$, $150_2$, $150_3$, and $150_n$, respectively, to which the UE 110 has active bearers. At events $455_a$, $455_b$, $455_c$, and $455_d$, each of the PDN gateways $150_1$, $150_2$, $150_3$, and $150_n$, respectively, acknowledges the Delete Bearer Request messages with Delete Bearer Response messages. Again, the Request messages and Response messages do not necessarily alternate, and these messages may be exchanged between the PDN gateways 150 and the serving gateway 140, the MME 130, or a single component that includes both the MME 130 and the serving gateway 140.

At event 456, if one or more PCRFs 190 are deployed, the PDN gateways 150 might interact with the PCRFs 190 to indicate to the PCRFs 190 that the bearers are released. At event 457, the serving gateway 140 acknowledges the MME's Delete Bearer Request message with a Delete Bearer Response message to the MME 130. The serving gateway 140 acknowledges to the MME 130 with a Delete Bearer Response message only after receiving Delete Bearer Response messages from all of the PDN gateways 150.

At event 458, if the UE 110 received a Detach Request message from the MME 130 at event 452, the UE 110 sends a Detach Accept message to the MME 130. This event can occur any time after event 452. At event 459, the MME 130 confirms the deletion of the bearers and the mobility management contexts by sending a Cancel Location Acknowledgement message to the HSS/AAA 180. At event 460, after the MME 130 receives the Detach Accept message, the MME 130 releases its signaling connection with the UE 110 by sending a Release Command to the ENB 120 indicating that the cause for the release was a detach. Events 452, 458, and 460, which involve the UE 110, might occur only when the cancellation type is set to "subscription withdrawn".

In FIG. 4a, as in FIGS. 2a and 3a, the MME 130 sent a single message to the serving gateway 140 containing a list of all PDN gateways 150 to be detached. The serving gateway 140 then sent individual bearer deletion messages to each of the PDN gateways 150 and received individual bearer response messages from each of the PDN gateways 150. The serving gateway 140 then sent a single bearer response message to the MME 130 listing all the PDN gateways 150 from which it received bearer response messages. In an alternative embodiment, the MME 130 might send individual bearer deletion messages to the serving gateway 140 for each PDN gateway 150 to be detached, and the serving gateway 140 might then send individual bearer deletion messages to each of the PDN gateways 150 as in FIGS. 2a and 3a.

This case is illustrated in FIG. 4b, where the MME 130 sends a Delete Bearer Request message to the serving gateway 140 at event $473_a$ after the Cancel Location and Detach Request messages are sent at events 471 and 472. At event $474_a$, the serving gateway 140 then sends a Delete Bearer Request message to PDN gateway $150_1$. At event $475_a$, PDN gateway $150_1$ acknowledges the Delete Bearer Request message with a Delete Bearer Response message. At event $476_a$, the serving gateway 140 sends a Delete Bearer Response message to the MME 130. A similar set of events could occur for each of the other PDN gateways $150_2$, $150_3$, and $150_4$, but it should be noted that the events do not necessarily occur in the order illustrated. For example, the MME 130 might send the second Delete Bearer Request message, as shown at event $473_b$, before the serving gateway 140 sends PDN gateway $150_1$ the first Delete Bearer Request message, as shown at event $474_a$, or before PDN gateway $150_1$ sends the serving gateway 140 the first Delete Bearer Response message, as shown at event $475_a$. Other sequences for these events may be apparent to one of skill in the art. The complete detach sequence might be considered complete only when all of the Delete Bearer Response messages at events 476 have been received by the MME 130.

At event 477, if one or more PCRFs 190 are deployed, the PDN gateways 150 might interact with the PCRFs 190 to indicate to the PCRFs 190 that the bearers are released. These interactions might occur after all the Delete Bearer Response messages at events 476 have been sent, as shown, or might occur intermittently among the various Delete Bearer Response messages at events 476. Events 478, 479, and 480 can then occur in a manner similar to events 458, 459, and 460 of FIG. 4a.

In any of the three types of detach discussed above, the serving gateway 140 might not receive Delete Bearer Response messages from all of the PDN gateways 150 to which the serving gateway 140 sent Delete Bearer Request messages. For example, the serving gateway 140 might send Delete Bearer Request messages to four PDN gateways 150 but might receive Delete Bearer Response messages from only three PDN gateways 150. When the serving gateway 140 does not receive a corresponding Delete Bearer Response message for each Delete Bearer Request message that it sends, a failure of the multi-PDN gateway detach procedure may be indicated.

In an embodiment, one of the components in the system 100 can include a timer 195 that can keep track of the time that has elapsed since the last Delete Bearer Request message was sent from the serving gateway 140 to the PDN gateways 150. If a pre-specified period of time elapses before the serving gateway 140 receives Delete Bearer Response messages from all of the PDN gateways 150 to which the serving gateway 140 sent Delete Bearer Request messages, the multiple-PDN gateway detach can be considered to have failed. When a detach failure occurs, the multiple-PDN gateway detach procedure can be restarted at any point before or including the point where the MME 130 sends the Delete Bearer Request message to the serving gateway 140.

Figure 5:
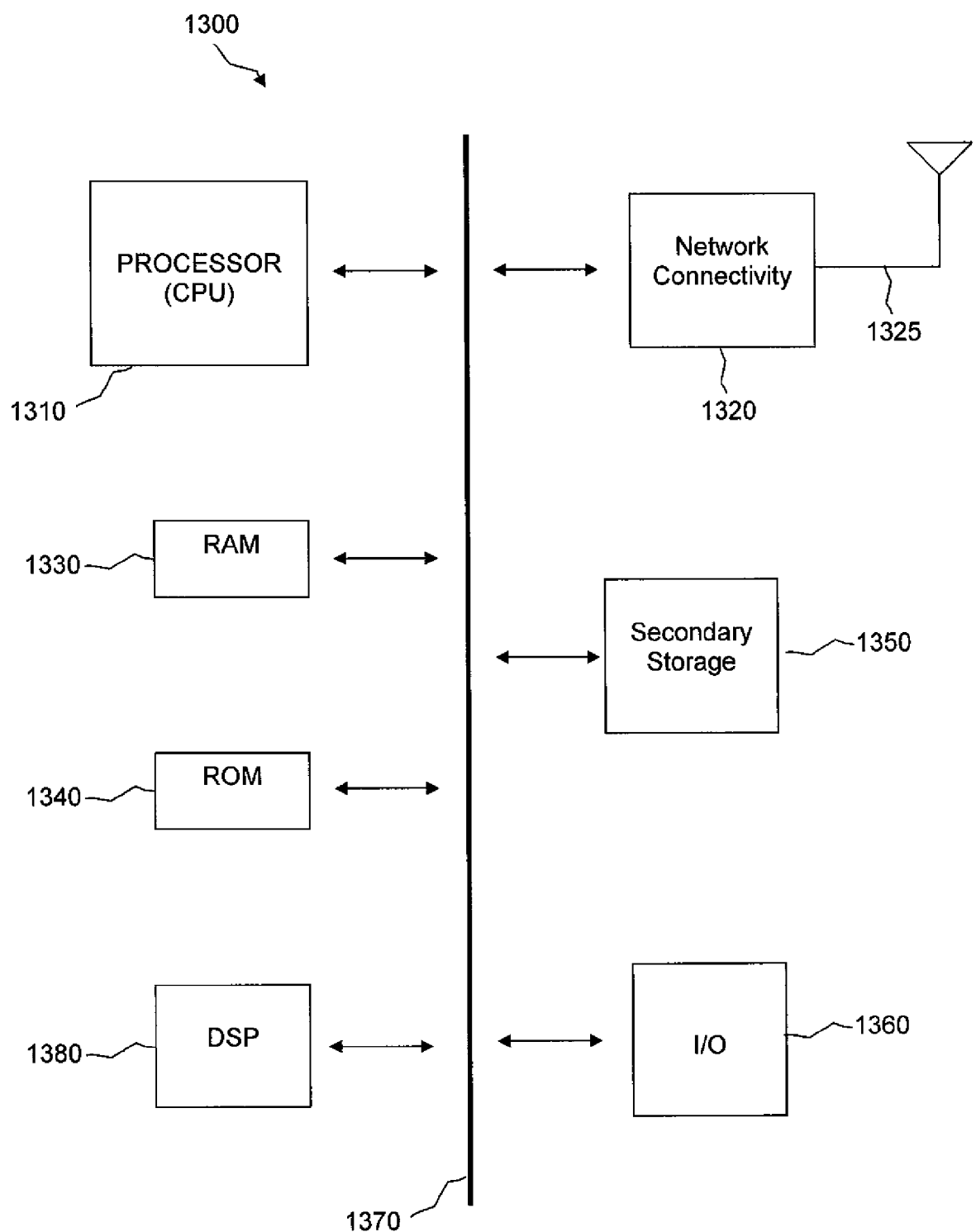
FIG. 5 illustrates a processor and related components suitable for implementing the several embodiments of the present disclosure.

The UE 110 and other components described above might include a processing component that is capable of executing instructions related to the actions described above. FIG. 5 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1380. Although the DSP 1380 is shown as a separate component, the DSP 1380 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, digital subscriber line (xDSL) devices, data over cable service interface specification (DOCSIS) modems, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver component 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1325 might be considered to be a component of the I/O devices 1360 instead of or in addition to being a component of the network connectivity devices 1320.

The following are incorporated herein by reference for all purposes: 3$^{rd}$ Generation Partnership Project (3GPP) Technical Specification (TS) 23.401 for LTE UE 3GPP radio network accesses to the evolved packet core (EPC) and (TS) 23.402 for LTE UE non-3GPP network accesses. For the LTE UE non-3GPP accesses, the LTE UE multiple PDN detach procedures in the embodiment may involve different radio network access protocols and different network element entities.

According to one embodiment, a system is provided that includes a component configured to promote detachment of a user equipment (UE) from a plurality of packet data network (PDN) gateways by sending a message to each of the plurality of PDN gateways to which the UE has at least one active bearer. The message requests that at least one of the plurality of PDN gateways delete the at least one active bearer.

In another embodiment, a method is provided for detaching user equipment (UE) from a plurality of packet data network (PDN) gateways. The method includes sending a message to each of the plurality of PDN gateways to which the UE has at least one active bearer, the message requesting that at least one of the plurality of PDN gateways delete the at least one active bearer. The method also includes taking further steps in detaching the UE. In some embodiments, the method may include taking further steps in detaching the UE only when all of the PDN gateways respond to the messages.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for detaching a user equipment (UE) from a plurality of packet data network (PDN) gateways, comprising:

receiving a single message at a mobile management entity (MME) associated with the plurality of PDN gateways to which the UE has more than one active bearer;

responsive to receiving the single message, the MME sending a plurality of separate messages to a serving gateway, a separate message for each of the active bearers to be detached; and responsively sending, by the serving gateway, a separate delete bearer request message to each of the plurality of PDN gateways to which the UE has the more than one active bearer.

2. The method of claim 1, wherein the single message is sent to the MME by one of:

a component that includes the mobility management entity and the serving gateway;

a home subscriber server (HSS); and the UE.

3. The method of claim 2, wherein the MME initiates the detach by one of:

sending a request for the detach to the UE; and implicitly initiating the detach without informing the UE of the detach when communication with the UE is presumed to be lost.

4. The method of claim 1 further comprising, when all of the PDN gateways do not respond to the requests within a pre-specified time, restarting the detaching of the UE from the plurality of PDN gateways.

5. The method of claim 1, wherein taking further steps in detaching the UE includes only when all of the PDN gateways respond to the requests.

6. A system, comprising:

a component configured to promote detachment of a user equipment (UE) from a plurality of packet data network (PDN) gateways to which the UE has more than one active bearer in response to receiving a single message by sending a plurality of separate messages to a serving gateway, a separate message for each of the active bearers to be detached, the serving gateway responsively sending a separate delete bearer request message to each of the plurality of PDN gateways to which the UE has the more than one active bearer in order to detach the UE.

7. The system of claim 6, wherein receiving the message initiates detachment of the UE from the plurality of PDN gateways, and wherein the detachment is initiated by one of:

the UE;

a mobility management entity;

a component that includes the mobility management entity and the serving gateway; and a home subscriber server (HSS).

8. The system of claim 7, wherein the mobility management entity initiates the detachment by one of:

sending a request for the detachment to the UE; and implicitly initiating the detachment without informing the UE of the detachment when communication with the UE is presumed to be lost.

9. The system of claim 6 wherein the component takes no further actions in the detachment of the UE until all of the PDN gateways respond to the requests.

10. The system of claim 6 further comprising a timer configured to measure a time elapsed since a last one of the requests was sent to the PDN gateways, and further configured, when all of the PDN gateways do not respond to the requests within a pre-specified time period after the last one of the requests was sent to the PDN gateways, to promote another attempt of the detachment of the UE from the plurality of PDN gateways.

11. A method for detaching a user equipment (UE) from a plurality of packet data network (PDN) gateways, the method comprising:

when the UE is connected to and has more than one active bearer for the plurality of PDNs, a mobile management entity (MME) sending a plurality of separate messages to a serving gateway, a separate message for each of the active PDN connections to be detached, and responsively sending, by the serving gateway, a separate delete bearer request message to a correspondent PDN gateway of the plurality of PDN gateways to which the UE has the more than one active bearer for the PDN.

12. The method of claim 11, wherein detaching the UE from the plurality of PDN gateways is initiated by one of:
the UE;
the MME;
the serving gateway;
a component that includes at least one of the MME and the serving gateway; and
a home subscriber server (HSS).

13. The method of claim 11, wherein detaching the UE from the plurality of PDN gateways is initiated by one of:
sending a request for the detach to the UE;
sending a request for the detach to the MME; and
implicitly initiating the detach without informing the UE of the detach when communication with the UE is presumed to be lost.

14. The method of claim 11, wherein the MME sends the separate message for each of the active PDN connection in response to receiving a single message, the single message being sent by one of:
the UE;
the serving gateway; and
a home subscriber server (HSS).

* * * * *